United States Patent
White

[11] 3,829,983
[45] Aug. 20, 1974

[54] GRID PLATE

[75] Inventor: Newell J. White, Houston, Tex.

[73] Assignee: Phillips Petroleum Company, Bartlesville, Okla.

[22] Filed: Oct. 27, 1971

[21] Appl. No.: 192,900

[52] U.S. Cl............ 34/57 A, 23/288 S, 432/58
[51] Int. Cl............................. F26b 17/14
[58] Field of Search......... 23/288 S; 34/10, 57 A; 263/21 A; 432/15, 58

[56] References Cited
UNITED STATES PATENTS

| 2,740,752 | 4/1956 | Anhorn | 208/157 |
| 2,990,260 | 6/1961 | Mungen | 23/284 X |
| 2,990,260 | 6/1961 | Mungen | 23/288 S |
| 3,370,361 | 2/1968 | Guerrieri | 34/57 A |
| 3,379,345 | 4/1968 | Gehrung | 222/195 |
| 3,514,868 | 6/1970 | Hoggarth | 34/57 A |
| 3,765,101 | 10/1973 | Avery | 34/57 A |

FOREIGN PATENTS OR APPLICATIONS

| 714,870 | 9/1954 | Great Britain | 23/284 |

Primary Examiner—Carroll B. Dority, Jr.
Assistant Examiner—William C. Anderson

[57] ABSTRACT

A grid plate having an inverted conical configuration, an axis, an axially aligned opening therethrough, a lower surface and an upper surface, there being formed in the upper surface a plurality of depressions with each of the depressions having an aperture penetrating the lower surface of the grid plate.

6 Claims, 3 Drawing Figures

INVENTOR.
N. J. WHITE

BY *Young & Quigg*

ATTORNEYS

GRID PLATE

This invention relates to activation of catalyst. In another aspect this invention relates to a grid plate.

A fluidized bed of finely divided solids can be obtained by placing the finely divided solids on a perforated plate in a suitable chamber, having the solids supported on the perforated plate, and passing gas through the chamber below the perforated plate up through the perforations into the bed thereby fluidizing the solids in the bed. Due to the physical characteristics of finely divided solids, unevenness of gaseous flow through the perforations in the plate supporting the solids allows partial backflow of the solids into the holes of the plate thereby causing plugging and defluidization of the bed.

High gas velocity is generally relied upon to keep the solid particles from passing downwardly through the openings or perforations in the grid plate. Even when high fluidizing gas velocities are utilized it is found that, where simple orifice openings in a grid plate are used, the finely divided solids backflow through the orifice openings into the fluidizing gas, further creating plugging problems.

In the preparation of catalyst, for example, many times fluidizing activation is required. The catalyst may be formed into a shape and thereafter it may be contacted with a gas, such as steam or air, for the purpose of drying or activating. Normally, such catalysts are positioned in the form of a bed and a fluid is passed up through the bed. Sometimes the catalysts are placed on trays formed of screens or crossbars, wherein the trays or screens have openings sufficiently smaller than the particles for the purpose of retaining the particles thereabove.

Catalyst drying and activation many times requires high gas velocities which result in channeling through the catalyst beds. This channeling effect results in inadequate contact between all catalyst particles and the flowing fluid with certain particles being insufficiently contacted while other particles will be overly contacted and, as a result, the bed as a whole will be unsatisfactorily treated.

In order to obtain a high degree of efficiency of gas solids mixing and to prevent backflow of solids, it is desirable to inject the fluidizing gas into the finely divided solids at reasonable gas velocities. Heretofore, fluidizing the solids by passing the fluidizing gas into the finely divided solids through simple orifice openings even at high velocities resulted in ineffective gas channeling and/or plugging of the orifices. Applicant has found that through the utilization of a grid plate having overlapping depressions covering an upper surface with apertures extending from the depressions through the lower surface of said grid plate, fluidizing can be more readily controlled without jetting or aperture plugging.

The grid plate of the present invention is usable as a tray for the support of a catalyst material whether the catalyst is being activated, regenerated, or being used in the catalytic contacting of a process. According to the invention, there is provided a grid plate having an inverted conical configuration. The grid plate has an axis, an axially aligned opening therethrough, a lower surface and an upper surface, there being formed in the upper surface a plurality of depressions, said depressions having angularly disposed side walls, the side walls of adjacent depressions being in intersecting relationship to form a nonplanar upper surface, said depressions having an aperture formed in their lower extremity, with said aperture penetrating the lower surface of the grid plate.

The grid plate of this invention can be constructed of any material which will withstand the conditions to which the plate is subjected. Usable materials include carbon steels and austenitic stainless steel. The grid plate can be made of any overall dimension and can be equipped with any number and size of apertures or air entry ports, depending upon the permissible pressure drop desired through the system. The grid plate can be employed with any solid size, shape and material and in any process requiring a fluidizing contact of solids. The size of the apertures of the tray can be smaller or larger than the size of the solids to be fluidized, the larger apertures being used in those instances when flow of the fluid is established up through the apertures prior to the introduction of particulate solids onto the grid plate, the solids being activated in the form of a fluidizing bed and thereafter flowing through fluidizing actions toward and through the axially aligned center opening of the grid plate.

A preferred embodiment of the invention incorporates a laminated wire mesh firmly attached to the upper surface of the grid plate. The laminated mesh wire is defined as having a mesh size resulting from about a 10 × 52 plain Dutch weave up to about a 24 × 110 plain Dutch weave which allows the fluidizing air to pass through it in an infinite number of tiny streams completely dispersed across the area of the grid plate. This complete dispersion of the air allows fluidization of the catalyst bed while decreasing the jetting action of air volumes flowing through holes of a larger diameter. In addition, the laminated wire mesh offers sufficient resistance to provide an air pressure on the upstream side of the grid plate large enough to ensure complete air distribution even at low air velocities. The laminated wire mesh opening size will vary from the aforementioned range depending upon the type, shape and size of catalyst and/or solids to be fluidized. Aperture size and screen mesh size will further depend upon the temperature and fluiding gas velocities desired, and upon the operational requirements.

DESCRIPTION OF THE DRAWINGS

The invention will be more easily understood by referring to the attached drawings in which

Referring now to FIG. 1, there is shown grid plate 1 which is of an inverted conical configuration, but can be of varying thickness, size and surface angulation. The grid plate 1 has a cross-sectional axis as illustrated by 3—3 and an outer edge 3 which is of the same dimension as the inner dimension of the containing vessel. Grid plate 1 has a nonplanar upper surface 4 formed of a series of depressions 5. The depressions 5 have apertures 6 which penetrate the grid plate 1. The upper surface 4 has an axially aligned opening 7 which corresponds with the apex of the inverted conical configuration of grid plate 1.

Figure 2:
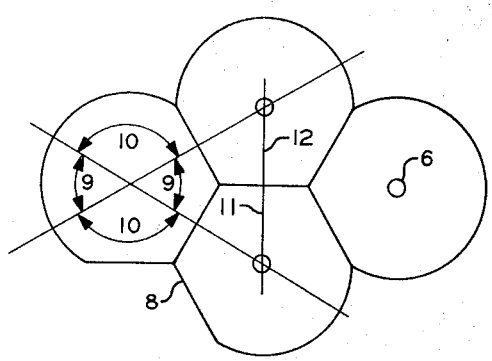

In a preferred embodiment, as illustrated by FIG. 2, the depressions 5 have the apertures 6 positioned at the apex of the depressions which have inverted conical configurations. The cones are preferably spaced so that their upper edges lie in intersecting relationship such that the circle forming their base intersects with other base-forming circles, resulting in a configuration, when viewed from the top, projects as a series of hexagonal-based inverted cones 8. The apertures 6 are spaced symmetrically as defined by the angles 9 and 10 and the equidistance therebetween as defined by intersecting diameters 11 and 12.

Figure 1:
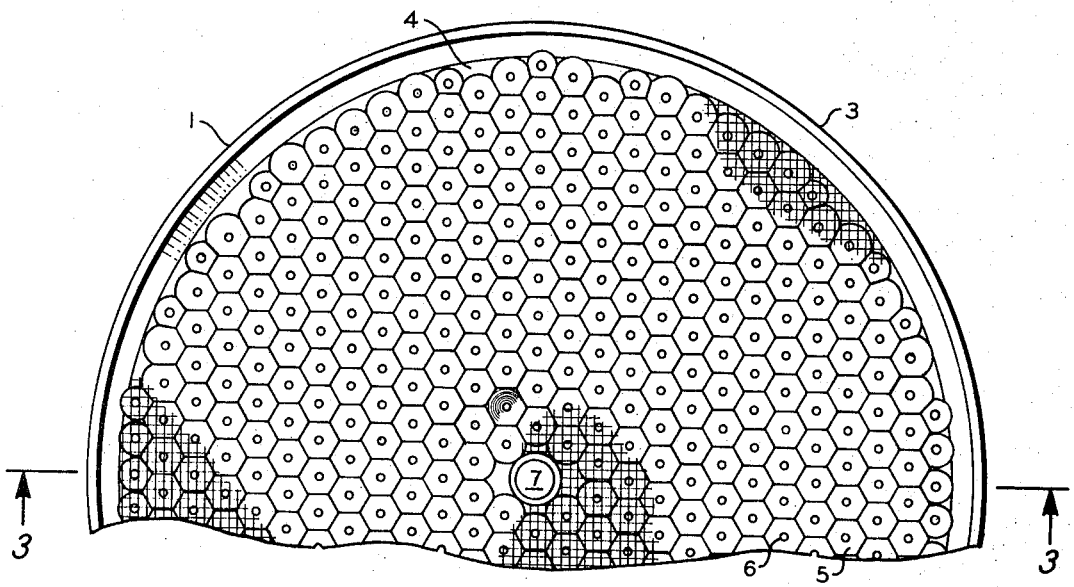
FIG. 1 illustrates a top view of the apparatus of the invention. An enlarged view of a section of FIG. 1 is illustrated by FIG. 2.
Figure 3:
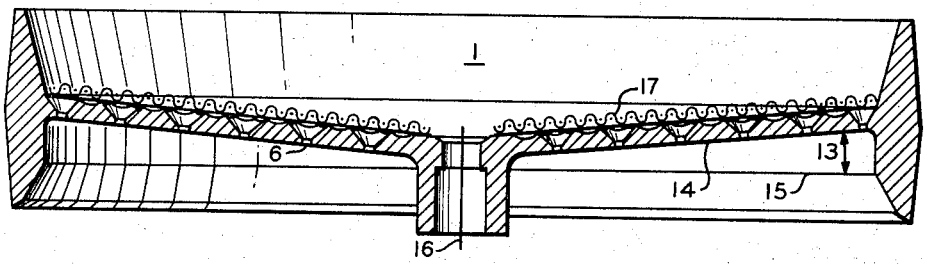
FIG. 3 is a cross-sectional view taken along sectional axis 3—3 of FIG. 1.

FIG. 3 illustrates the inverted conical configuration of the grid plate 1 having an angle 13 which varies up to 45 degrees and is formed by the lower surface of the plate 14 and the horizontal 15, which intersect at a point of convergence 16. The point of convergence 16 also corresponds to the vertical axis of the grid plate 1. In a preferred embodiment, the apertures 6 have axial alignments perpendicular to the lower plate surface 14. An optional embodiment of the invention, the laminated wire mesh 17, is attached to the upper surface 4 and conforms to the inverted conical configuration thereof.

While the depressions in the upper surface of the plate can be of any configuration, they will be preferably of an inverted conical configuration, the angles of the depressions being positioned at about 35° to about 55° to the surface of the plate. Preferably, the sides of the depressions will be formed at an angle slightly in excess of the angle of repose of the solid material being fluidized. Also, the depressions are positioned in such adjacency that the flat area of the plate between depressions is eliminated or at least minimized, through the overlapping effect of the depressions.

The apparatus of the present invention was used for activating a metal-containing catalyst. The plate had a thickness of 1⅛ inch. It was 43 inches in diameter and its surface contained about 474 conical depressions, each being centered about an aperture ⅛ inch in diameter. The sides of the conical depressions were positioned at an angle of about 45° from the surface of the plate. The axially aligned center opening had a diameter of 1⅞ inches and the angle formed by the lower surface of the plate and the horizontal was about 5½ degrees. A single grid plate was employed within a vertical tower and fluid bed catalyst activation was accomplished with air at about 1,800° F and at a throughput of about 17 SCFM per square foot of laminated wire mesh.

Activation was complete after 4 to 5 hours and metal loss from the catalyst, which prior to the use of the trays of this invention had been about 18 percent, was about 12 percent.

What I claim is:

1. A grid plate having an inverted conical configuration with an axis, an enlarged axially aligned material discharge opening therethrough which provides a passageway for the removal of treated material from the upper surface of said grid plate, a lower surface, an upper surface converged conically downward to said opening with the upper surface having a plurality of conical depressions arranged in a triangular pattern formed therein, said depressions having angularly disposed side walls which are disposed at an angle of from about 35° to about 55° from said upper surface of said grid plate, the side walls of adjacent depressions being in intersecting relationship to form a nonplanar upper surface with the further proviso that said conical depressions are spaced such that the circle forming their base intersects with other base-forming circles, resulting in a configuration, when viewed from the top, which projects as a series of hexagonal-based inverted cones, said depressions having an aperture formed in their lower extremity, said apertures penetrating said lower surface of said grid.

2. A grid plate according to claim 1 wherein a laminated wire mesh having a mesh size defined as ranging from about a 10 × 52 plain Dutch weave to about a 24 × 110 plain Dutch weave is attached to the upper surface in a conforming configuration of said upper surface.

3. A grid plate according to claim 1 wherein the lower surface forms an angle of up to 45° with a horizontal plane, with the lower surface and the horizontal plane having a point of convergence fixed on the axis of the grid plate.

4. A grid plate according to claim 1 wherein the apertures are formed by the projection of said angularly disposed walls.

5. A grid plate according to claim 1 wherein the apertures are axially aligned perpendicularly to the lower surface of the grid plate.

6. A grid plate according to claim 1 wherein the depressions and corresponding apertures are symmetrically distributed.

* * * * *